United States Patent [19]

Farmwald

[11] Patent Number: 4,639,887

[45] Date of Patent: Jan. 27, 1987

[54] BIFURCATED METHOD AND APPARATUS FOR FLOATING POINT ADDITION WITH DECREASED LATENCY TIME

[75] Inventor: Paul M. Farmwald, Livermore, Calif.

[73] Assignee: The United States of America as represented by the United States Department of Energy, Washington, D.C.

[21] Appl. No.: 583,531

[22] Filed: Feb. 24, 1984

[51] Int. Cl.[4] ............................................. G06F 7/50
[52] U.S. Cl. .................................................... 364/748
[58] Field of Search ................................ 364/748, 788

[56] References Cited

U.S. PATENT DOCUMENTS 3,814,925 6/1974 Spannagel .......................... 364/748
4,488,252 12/1984 Vassar ................................ 364/748

OTHER PUBLICATIONS

Earlen et al., "Exponent Differences and Preshifter" *IBM Tech. Disclosure Bulletin*, vol. 9, No. 7, Dec. 1966, pp. 848–849.

Levine, "Fraction Addition or Subtraction or Comparison Overlap with Characteristic Comparison" *IBM Tech. Disclosure Bulletin* vol. 15, No. 7, Dec. 1972, p. 2162.

Agerwala et al, "Floating Point Addition and Subtraction Enhancement" *IBM Tech. Disclosure Bulletin* vol. 24, No. 1B, Jun. 1981, pp. 722–774.

*Primary Examiner*—David H. Malzahn
*Attorney, Agent, or Firm*—Henry P. Sartorio; Clifton E. Clouse, Jr.; Judson R. Hightower

[57] ABSTRACT

Apparatus for decreasing the latency time associated with floating point addition and subtraction in a computer, using a novel bifurcated, pre-normalization/post-normalization approach that distinguishes between differences of floating point exponents.

14 Claims, 5 Drawing Figures

$(|EXP_A - EXP_B| \geq 2)$

BIFURCATED METHOD AND APPARATUS FOR FLOATING POINT ADDITION WITH DECREASED LATENCY TIME

The Government of the United States of America has rights in this invention pursuant to Department of Energy Contract W-7405-ENG-48 between the U.S. Department of Energy and the University of California for the operation of Lawrence Livermore National Laboratory.

FIELD OF THE INVENTION

The invention pertains to high speed digital computers, and more particularly to methods and apparatus for performing floating point operations in digital computers.

BACKGROUND OF THE INVENTION

High speed computing normally requires many-fold repetitive arithmetic operations (addition, subtraction, multiplication, division, exponentiation, etc.). An increase in efficiency of one or more of such operations translates directly into proportionate time savings in computer operation. In floating point operations, whereby any numerical operand x ($\neq$ 0) is represented by a unique ordered pair of numbers (e, f) such that e is an integer and f satisfies $1 \leq |f| < 2$ so that $x = 2^e f$, paradoxically, the addition and subtraction operations are more cumbersome than the operations of multiplication, division and exponentiation. Thus, efficiency improvements in floating point addition and subtraction are of special interest.

Bohm, in U.S. Pat. No. 3,315,069, discloses and claims a computer that is constructed to always form the quantity $F(a, b, c, d) = (a \pm b) \times c \div d$ in response to any binary arithmetic input (a, b) or (a, c) or (a, d) or (b, c) or (b, d) or (c, d); with the other two arithmetic inputs being chosen to produce the particular arithmetic result desired. For example, if the difference $a-b$ is desired, the function F and its four inputs become $F(a, -b, 1, 1) = (a-b) \times 1 = a-b$; and if the quotient $a \div d$ ($d \neq 0$) is called for, the function F and its inputs becomes $F(a, 0, 1, d) = a/d$. Groups of four registers, one containing each of the inputs a, ($\pm$)b, c and d, are logically connected so that the result $F(a, b, c, d) = (a \pm b) \times c/d$ is always produced. The inventor notes that time for addition or subtraction in this scheme is substantially longer than addition or subtraction in a conventional approach. And use of floating point numbers would pose further problems and require additional computer time.

Kindell et al disclose and claim computer apparatus for consistently "rounding off" positive and negative numbers in 2's complement representations of floating point numbers, in U.S. Pat. No. 3,699,326. A rounding constant, different for positive and for negative numbers, is added to such numbers for purposes of storage or comparison. The logic used causes consistent round up (round down) to an n-bit number if the actual, untruncated number minus the n-bit truncated number lies closest to or equidistant between the "upper" ("lower") of two adjacent values of the number truncated at the $n^{th}$ bit. No means of forming sums or differences of two floating point numbers is discussed.

Method and apparatus for approximately simultaneous computer computation and processing of coefficients for two Fast Fourier Transform algorithms is disclosed and claimed in U.S. Pat. No. 3,721,812, issued to Schmidt. In one embodiment, the Schmidt invention interlaces two serial streams of appropriate data in a single serial access memory so that two Fast Fourier Transforms may be calculated substantially simultaneously, thus reducing the time normally required for computation of the FFT by approximately 50 percent. However, the invention does not concern simultaneous performance of additions and subtractions of floating point representations of numbers.

SUMMARY OF THE INVENTION

The subject invention is method and apparatus for performing floating point arithmetic operations such as addition and subtraction of two floating point (binary) numbers $x_A = (2^{e_A})f_A$ and $x_B = (2^{e_B})f_B (1 \leq f_A, f_B < 2, e_A$ and $e_B$ integers), on a computer in a time-efficient manner.

One object is to provide an approach for floating point addition and subtraction that consumes less computer time relative to prior art approaches.

Another object is to provide an approach for performing floating point addition and subtraction simultaneously.

Other objects of the invention, and advantages thereof, will become clear by reference to the detailed description and the accompanying drawings.

To achieve the foregoing objects in accordance with the invention, the conventional three step process of prenormalization, addition, and postnormalization for performing a floating point arithmetic operation is broken up into two parallel two step processes, each two step process essentially eliminating one of the steps of the three step process. The two paths provide the correct answer for the two cases where the exponents are close (exponent difference $\leq$ 1) or far apart ($>$ 1), respectively. A floating point arithmetic operation is performed simultaneously in both paths, without regard to which condition is actually true, and the correct answer is selected from the results by means of a simple test of three bits of the answer. In the case where the exponents are close (difference $\leq$ 1), the prealignment step is eliminated since one of the numbers must at most be shifted one bit; the unshifted or one-bit shifted number is selected by means of a multiplexer using a simple test of the lower two bits of the exponents to provide the select signal. In the case where the exponents are far apart (difference $>$ 1), the post-normalization step is eliminated since once the numbers have been prealigned and added, the result requires at most a one-bit right or left shift, which can be selected by means of a multiplexer using a simple comparison of three bits of the result to provide the appropriate select signal.

In one preferred embodiment, the first path is implemented by a (short) alignment shift calculator which compares each lower two bits of the exponent and forms the control signals $r_A = \max(0, e_B - e_A)$, $r_B = \max(e_A - e_B, 0)$ which in this case are either 0 or 1. The outputs of a pair of two input multiplexers with inputs $f_A$, $\frac{1}{2} f_A$ and $f_B$, $\frac{1}{2} f_B$, respectively, are controlled by the select signals $r_A$ and $r_B$, respectively, to provide the appropriate inputs (either unshifted or shifted by one bit) into an adder/subtracter to form the sum $f_{tmp} = f_A 2^{-r_A} + f_B 2^{-r_B}$. The sum $f_{tmp}$ is input into a priority encoder which generates the function $S = |\log_2 |f_{tmp}||$. A shifter produces the result $f_r' = f_{tmp} 2^{-S}$ by shifting $f_{tmp}$ by S bits, and an adder produces the result $e_r' = e_{max} + S$.

The second path is implemented by a (full) alignment shift calculator which looks at the entire exponents and forms the control signals $r_A$ and $r_B$ (which may be $>1$ in this case). The control signals $r_A$ and $r_B$ are input to a pair of barrel shifters which shift $f_A$ and $f_B$, respectively, for proper prealignment to provide the appropriate input to an adder/subtracter which forms the sum $f_{tmp} = f_A 2^{-r_A} + f_B 2^{-r_B}$. By checking three bits of $f_{tmp}$, the two bits before the point $f_{tmp}(1)$ and $f_{tmp}(0)$ and the bit after the point $f_{tmp}(-1)$, for the presence of a 1, one of three answers can be selected from a four-input multiplexer $\frac{1}{2} f_{tmp}$, $f_{tmp}$, or $2 f_{tmp}$. If none of the bit tests are satisfied (none of the three test bits is a 1) then this indicates that the second path does not provide the correct answer and the first path result, which is the fourth input to the multiplexer, is the correct answer. The bit test also allows the selection of the correct exponent, $e_{max}+1$, $e_{max}$ or $e_{max}-1$, formed using adders, if one of the bit tests is satisfied, or the result from the first path if none of the bit tests are satisfied, with the four choices being inputs to a four-input multiplexer.

To perform simultaneous add and subtract in the first path, an exclusive or gate can be added to compare the sign bits of $f_A$ and $f_B$ and to select the signed inputs, either unshifted or one-bit shifted, from a four-input multiplexer. In the second path, a subtractor circuit is placed in parallel to the adder.

BRIEF DESCRIPTION OF THE DRAWINGS

The accompanying drawings, which are incorporated in and form a part of the specification, illustrate an embodiment of the invention and, together with the description, serve to explain the principles of the invention.

DETAILED DESCRIPTION

The invention provides method and apparatus for improved floating point arithmetic operation. In the prior art, floating point addition/subtraction is basically a three step process of alignment, addition and realignment. The invention shortens the conventional process by essentially eliminating the first or third step. According to the invention the numbers are first compared to determine if the exponents are greatly different or close together. The two cases are processed differently. Depending on the result of the comparison, one of two two-step processes is selected. The operations are performed simultaneously in two parallel independent paths, and the correct answer is selected according to the appropriate criteria from the answers produced in the two paths. If there is a large exponent difference the necessity for the realignment step is eliminated, and the process is essentially that of alignment and addition. If the exponents are close together, then the step of alignment is eliminated and the appropriate process is one of addition and realignment. Thus, by performing an initial comparison, one of the three full steps can be replaced by a much shorter operation which thereby reduces overall process time. This is accomplished by parallel hardware which produces two different answers only one of which is correct, for the two cases, the correct answer being selected by a simple test. The invention can be utilized to perform the operations $A+B$ and $A-B$ in pairs, one through the first two-step process and the other through the second two-step process, the two operations being performed independently in parallel.

This invention decreases the "latency" of certain floating point operations such as addition and subtraction for purposes of high speed computing. The "latency" of an operation is the time elapsed, beginning when an operation is first begun and ending when the immediately following operation that is dependent upon the first operation, is begun. A computer arithmetic operation may have many latencies, one for each possible way in which other operations can depend upon the subject operation. In high speed "number crunching" computer operations, latency is of critical importance, whether or not the machine is rapidly performing a repetitious sequence of arithmetic/logical operations through "pipelining". Thus, design of computer hardware for floating point addition/subtraction with minimal latency and high pipeline rate is very attractive.

Figure 1:
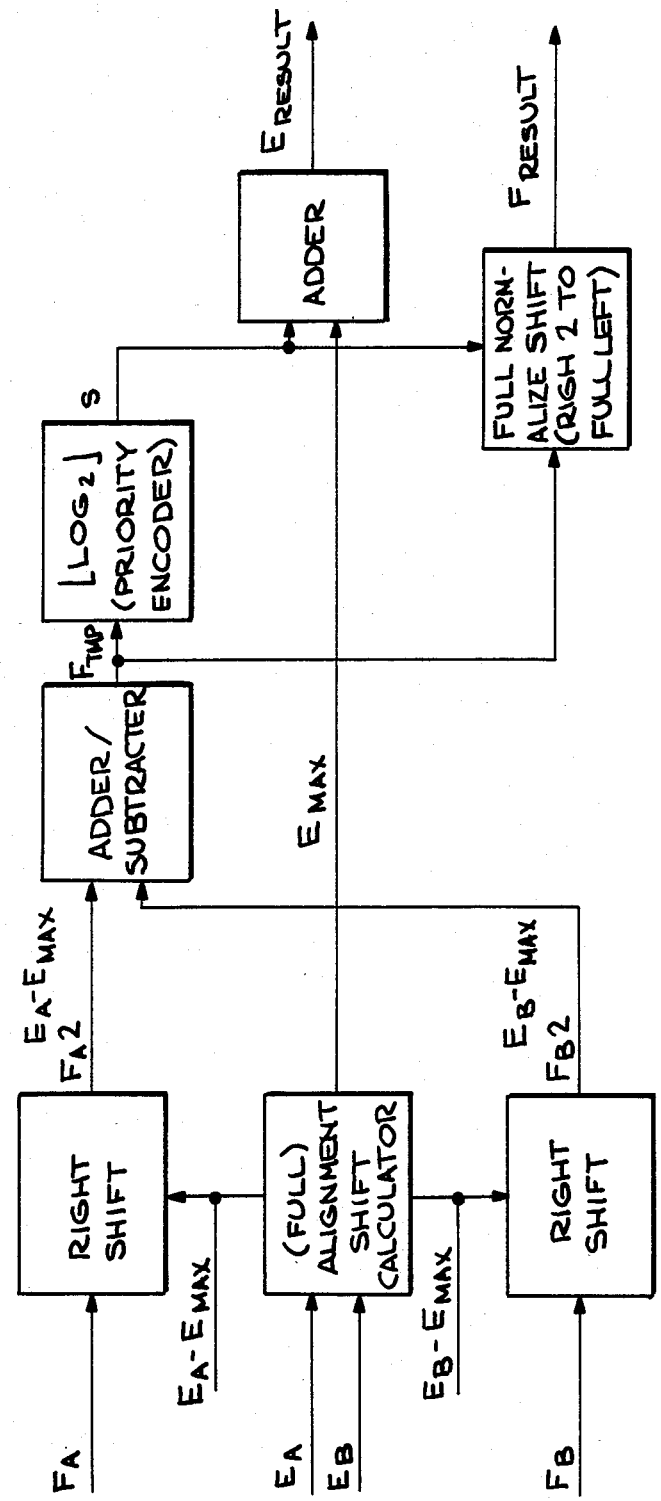
FIG. 1 is a schematic view of representative prior art apparatus for performing floating point addition.

A floating point number x is expressed as a pair of numbers (e, f), where the mantissa or fraction f (expressed in binary form) is a p-bit fixed point fraction whose magnitude lies between 1 and 2, $$1 \leq |f| < 2 \text{ (except for } x=0\text{)},$$

and the exponent e, is an integer, with the floating point number x being representable uniquely as $x = 2^e f$. Given two floating point numbers, $x_A = (e_A, f_A)$ and $x_B = (e_B, f_B)$, a conventional approach to compute the normalized floating point sum illustrated schematically with reference to FIG. 1, first determines $e_{max} = \max(e_A, e_B)$ and shifts both $x_A$ and $x_B$ downward by $e_{max}$ binary places using a full alignment shift calculator and a pair of right shifts to form $f_A 2^{e_A - e_{max}}$ and $f_B 2^{e_B - e_{max}}$; this assures that the exponents are both non-positive. The two modified numbers to form the sum are added in an adder/subtractor $$f_{tmp} = f_A 2^{e_A - e_{max}} + f_B 2^{e_B - e_{max}}$$

and the functions $$g_{tmp} = \log_2 |f_{tmp}|, \text{ and}$$

$$S = \lfloor g_{tmp} \rfloor,$$

where $\lfloor g \rfloor$ is the largest integer $\leq$ the real number g are formed by means of a priority encoder which counts leading zeros. The numbers $f_{tmp}$ and $g_{tmp}$ satisfy the condition $$|f_{tmp}| < 4,$$

$$-\infty < g_{tmp} < 2.$$

The result of the floating point operation is obtained by means of an adder and a full shift of S bits:

$$e_r = e_{max} + S,$$

$$f_r = 2^{-S} f_{tmp},$$

where $(e_r, f_r)$ is the pair of numbers representing the desired floating point sum. Two potentially large shifts must be performed serially in the conventional approach; the first shift initially aligns the operands; and the second shift renormalizes the result of the addition/subtraction operation. These full shifts, performed serially, represent a large fraction of the total latency (elapsed time) of conventional floating point addition and subtraction.

The subject invention provides a new approach, utilizing the fact that computation of the floating point sum (or difference) $x_A + x_B = f_A 2^{e_A} + f_B 2^{e_B}$ can be resolved into two mutually exclusive and exhaustive situations, each with a separate approach and corresponding hardware, and each being performable faster than by use of the conventional approach. The difference $|e_A - e_B|$ is formed in an exponent comparator (not shown). Two independent parallel computations are performed, as shown schematically in FIGS. 2 and 3, respectively, one for each of the two possible situations, and the correct answer is selected by examining the two results.

Situation 1: $|e_A - e_B| = 0$ or 1. The right shift operation, used to implement the usual division by $2^{|e_A - e_B|}$, is either no shift or a one-place right shift for numbers in binary form; and the shift itself can be determined by looking solely at the lowest two bits of each exponent $e_A$ and $e_B$. Only the lowest two bits are checked in the FIG. 2 path, and the calculation is performed as if the exponent difference is less than or equal to 1. The FIG. 2 path has been optimized for this case in terms of minimizing latency of operation. Of course, the test may not be true depending on the higher bits of the exponents. The correctness of the answer is determined by checking the result, as discussed below; it may turn out that the FIG. 3 answer is the correct result, in which case the FIG. 2 answer is rejected.

Formation of the sum (or difference) in this situation may be implemented using the apparatus of FIG. 2 as follows.

Set $e_{max} = \max(e_A, e_B)$;

if $e_A = e_B + 1$, set $r_A = 0$ and $r_B = 1$;

if $e_A = e_B$, set $r_A = r_B = 0$;

if $e_A = e_B - 1$, set $r_A = 1$ and $r_B = 0$;

or more generically, set $r_A = \max(e_B - e_A, 0) = e_{max} - e_A$ and $r_B = \max(e_A - e_B, 0) = e_{max} - e_B.$ The values of $r_A$ and $r_B$ can only be 0 or 1 (in this case). If $|e_A - e_B| < 1$, one need only compare the lowest two bits of each exponent to determine $e_{max}$, $r_A$ and $r_B$, which is considerably faster than comparing all bits of $e_A$ and $e_B$. The apparatus then forms the following functions and results:

$f_{tmp} = f_A 2^{-r_A} + f_B 2^{-r_B},$ $S = \lfloor \log_2 |f_{tmp}| \rfloor,$ $e'_r = e_{max} + S,$ $f_r = 2^{-S} f_{tmp}.$ In this situation, the time required to determine $e_{max}$, $r_A$ and $r_B$ is small as only two bits of $e_A$ and $e_B$ need be compared.

Figure 2:
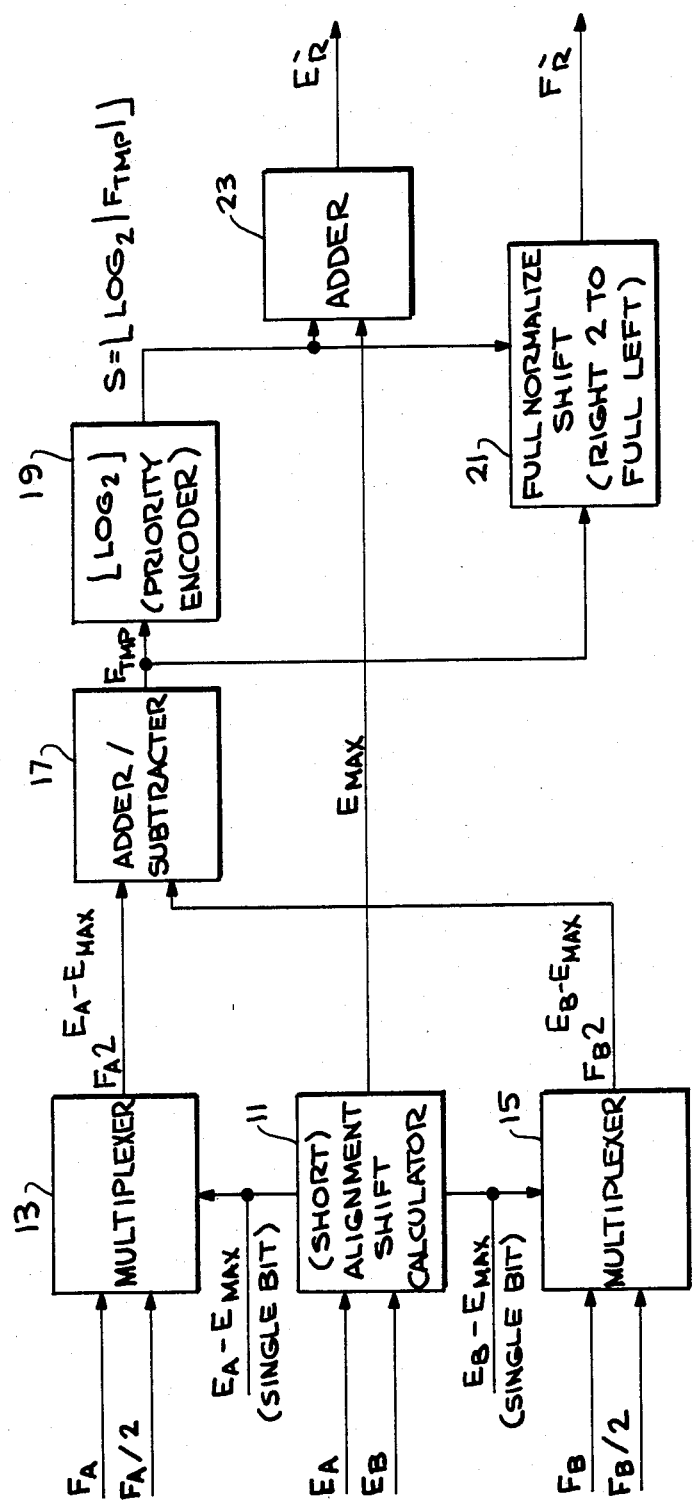
FIGS. 2 and 3 are schematic views of complementary apparatus, used in combination for performing floating point addition (or subtraction) according to the subject invention.

With reference to FIG. 2, the integers $e_A$ and $e_B$ are input to a short alignment/shift calculator 11 which generates $e_{max} = \max(e_A, e_B)$, which is input to a final adder 23 as shown, and also generates two numerical signals $r_A = \max(e_B - e_A, 0) = e_{max} - e_A$ and $r_B = \max(e_A - e_B, 0) = e_{max} - e_B$ that are input, respectively, as select signals to a pair of two input multiplexers 13 and 15. The multiplexer 13 receives input quantities $f_A$ and $f_A/2$, e.g., by wiring the appropriate bits of $f_A$ to the inputs of multiplexer 13, and, produces a single output, $f_A$ (if $r_A = 0$), or $f_A/2$ (if $r_A = 1$);

but no time consuming calculations need be performed by multiplexer 13. Similarly, the multiplexer 15 receives the input quantities $f_B$ and $f_B/2$ and produces a single output, $f_B$ (if $r_B = 0$), or $f_B/2$ (if $r_B = 1$).

The numerical signals $f_A 2^{-r_A}$ and $f_B 2^{-r_B}$ (outputs from the multiplexer 13 and 15, respectively) are now both input to an intermediate adder/subtracter 17 that forms and outputs the sum; and this output is input to priority encoder 19 that forms and outputs the numerical quantity $\log_2 |f|$ for any (real, positive) numerical input f. The output $S = \lfloor \log_2 |f_A 2^{-r_A} + f_B 2^{-r_B}| \rfloor$ of the priority encoder 19 and the output $e_{max}$ of the calculator 11 are both input to the final adder 23 that forms the sum $e'_r = e_{max} + S$. The output $f_{tmp} = f_A 2^{-r_A} + f_B 2^{-r_B}$ of the intermediate adder and output S of the priority encoder 19 are both input to a shifter 21 that forms and outputs the numerical quantity $f_r 2^{-S} f_{tmp}$. Since S is an integer, multiplication of $f_{tmp}$ by $2^{-S}$ is accomplished by merely right shifting $f_{tmp}$ by S places. Note that only one full shift operation is required in this situation, the postnormalization shift, by S bits, since the prealignment shift was eliminated. The prealignment operation was performed simply by comparing the two lowest bits of the exponents to determine the appropriate select signals to a pair of multiplexers which select either the unshifted number or the number right-shifted one bit.

Figure 3:
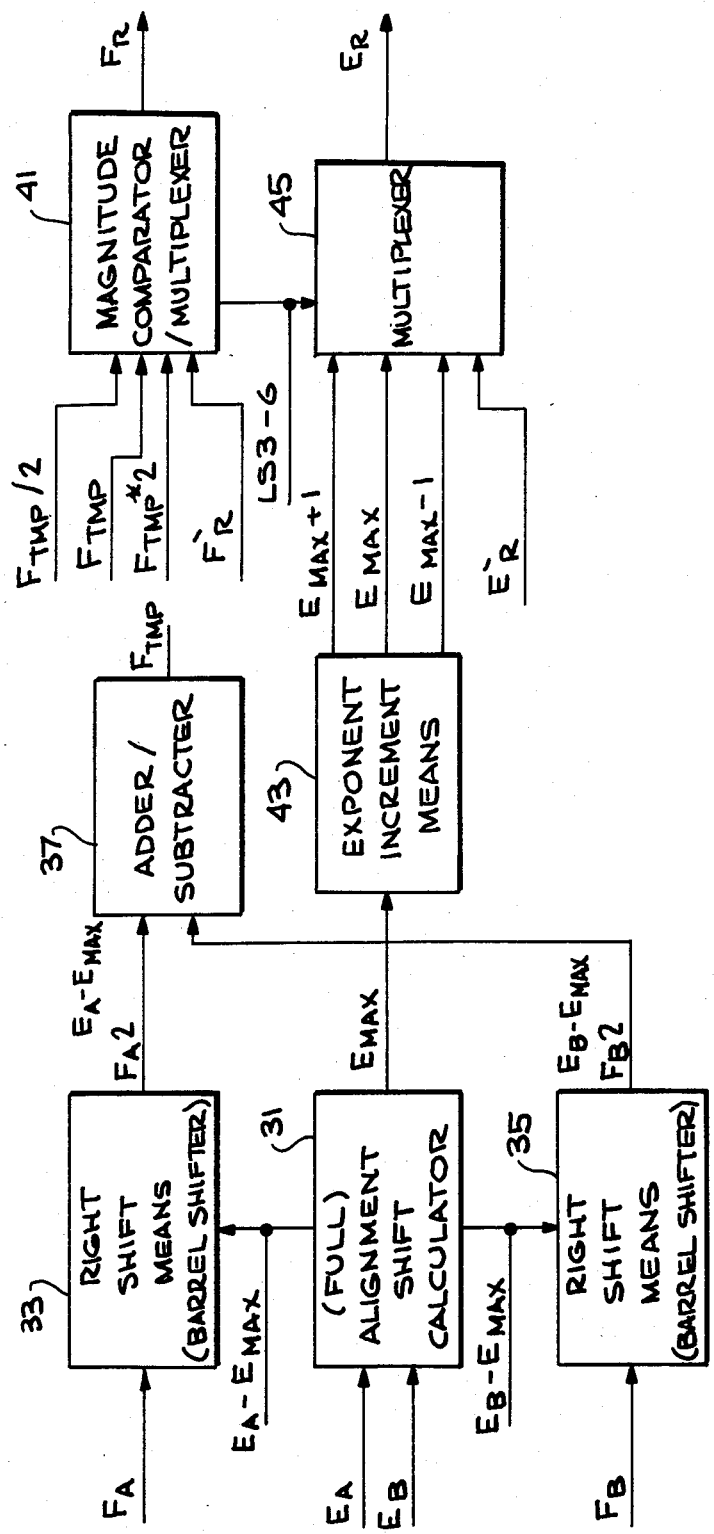

Situation 2: $|e_A - e_B| \geq 2$. Here, division by $2^{|e_A - e_B|}$ requires an arbitrarily large right shift (by two or more places) for pre-alignment; but postnormalization alignment will require at most a one place shift. To verify this, for the case where $e_A - e_B \geq 2$, then $|f_A + f_B 2^{-(e_A - e_B)}| \geq |f_A| - |f_B| 2^{-(e_A - e_B)} \geq 1 - 2^{1-(e_A - e_B)} \geq 1 - \tfrac{1}{2} = \tfrac{1}{2},$ $|f_A + f_B 2^{-(e_A - e_B)}| \leq f_A + f_B 2^{-(e_A - e_B)} \leq 2 + 2^{1-(e_A - e_B)} \leq 5/2.$ Thus, the result of addition (or subtraction) of $x_A$ and $x_B$ can never be so large or so small as to require more than a one place right or left shift to renormalize the sum $x_A+x_B$. Formation of the sum (or difference) in this situation may be implemented as follows, as illustrated in FIG. 3.

Set $e_{max}=\max(e_A, e_B)$;

calculate $$r_A=\max(e_B-e_A, 0)=e_{max}-e_A$$

and $r_B=\max(0, e_A-e_B)=e_{max}-e_B$ $$f_{tmp}=f_A 2^{-r_A}+f_B 2^{-r_B};$$

if $|f_{tmp}|\geq 2$, set $f_r=\frac{1}{2} f_{tmp}$ and $e_r=e_{max}+1$;  (1a)

if $1\leq |f_{tmp}|\leq 2$, set $f_r=f_{tmp}$ and $e_r=e_{max}$;  (1b)

if $\frac{1}{2}\leq |f_{tmp}|<1$, set $f_r=2 f_{tmp}$ and $e_r=e_{max}-1$;  (1c)

The formation of $f_r$, knowing the magnitude of $f_{tmp}$ ($\frac{1}{2}\leq |f_{tmp}|\leq 5/2$), requires at most a right or left shift of $f_{tmp}$ by one place plus a (simultaneous) addition or subtraction of zero or one from $e_{max}$ for the resultant exponent $e_r$.

These operations are implemented by the apparatus of FIG. 3. The integers $e_A$ and $e_B$ are input to a (full) alignment calculator 31 which generates $e_{max}$, $r_A$ and $r_B$. The output $e_{max}$ is input to exponent increment means 43 that forms and outputs three signals, $e_{max}+1$, $e_{max}$ and $e_{max}-1$, and feeds these three signals to a multiplexer 45.

The short alignment shift calculator 11 of FIG. 2 and the full alignment shift calculator 31 of FIG. 3 may, of course, be combined into a single unit as they receive the same inputs, perform precisely the same operations, and output the same variables; but the invention will form the sum or difference of $x_A$ and $x_B$ more quickly for $|e_A-e_B|\leq 1$ if a separate short alignment/shift calculator is used since the shift operation in this instance only requires examination of the two lowest order bits of $e_A$ and $e_B$.

The signals $r_A$ and $r_B$ from shift calculator 31 are input, respectively, as control signals to two right shift means (barrel shifters) 33 and 35. The shift means 33 and 35 also receive, respectively, the inputs $f_A$ and $f_B$ and form the respective outputs $f_A 2^{-r_A}$ and $f_B 2^{-r_B}$, by performing right shift of $f_A$ and $f_B$ by $r_A$ and $r_B$ places, respectively. The outputs of the right shift means 33 and 35 are input to an intermediate adder/substracter 37 that forms and outputs the sum $f_{tmp}=f_A 2^{-r_A}+f_B 2^{-r_B}$. The three signals $\frac{1}{2} f_{tmp}$, $f_{tmp}$ and $2 f_{tmp}$ are input, e.g., by wiring the appropriate bits to the input, to a multiple input magnitude comparator/multiplexer 41 that determines which of the three inequalities in Equations (1a, b, c) is true. If inequality (1a) is satisfied, the comparator 41 outputs $f_r=\frac{1}{2} f_{tmp}$ and sends a positive latch signal LS3 to the multiplexer 45, which then outputs $e_r=e_{max}+1$. If inequality (1b) is satisfied, the comparator 41 outputs $f_r=f_{tmp}$ and sends a positive latch signal LS4 to the multiplexer 45, which then outputs $e_r=e_{max}$. If inequality (1c) is satisfied, the comparator 41 outputs $f_r=2 f_{tmp}$ and sends a positive latch signal LS5 to the multiplexer 45, which then outputs $e_r=e_{max}-1$. If none of the conditions are satisfied (i.e., $|f_{tmp}|<\frac{1}{2}$), then set $f_r=f_r'$ and $e_r=e_r'$ from FIG. 2.

Thus, the correct output from the FIG. 3 path is determined by testing the magnitude of $f_{tmp}$ in comparator 41 and outputting the appropriate result $f_r=\frac{1}{2} f_{tmp}$, $f_{tmp}$ or $2f_{tmp}$. This process also selects the correct exponent from multiplexer 45. However, all three of the tests 1a, b, c may fail since the initial premise that $|e_A-e_B|\geq 2$ may not have been correct; in this case the correct answer was provided by the circuitry of FIG. 2, i.e., $|e_A-e_B|=0$ or 1. Accordingly, the result $f'_r$ from FIG. 2 is the fourth input to comparator 41 and is output if the three magnitude tests fail; also the result $e'_r$ for FIG. 2 is the fourth input to multiplexer 45 and is output, by applying latch signal LS6, when the final magnitude tests fail. The overall process time has been decreased by performing the simultaneous calculations of FIGS. 2 and 3 as if each case is true and then performing a simple comparison at the end to select the correct answer.

Figure 4:
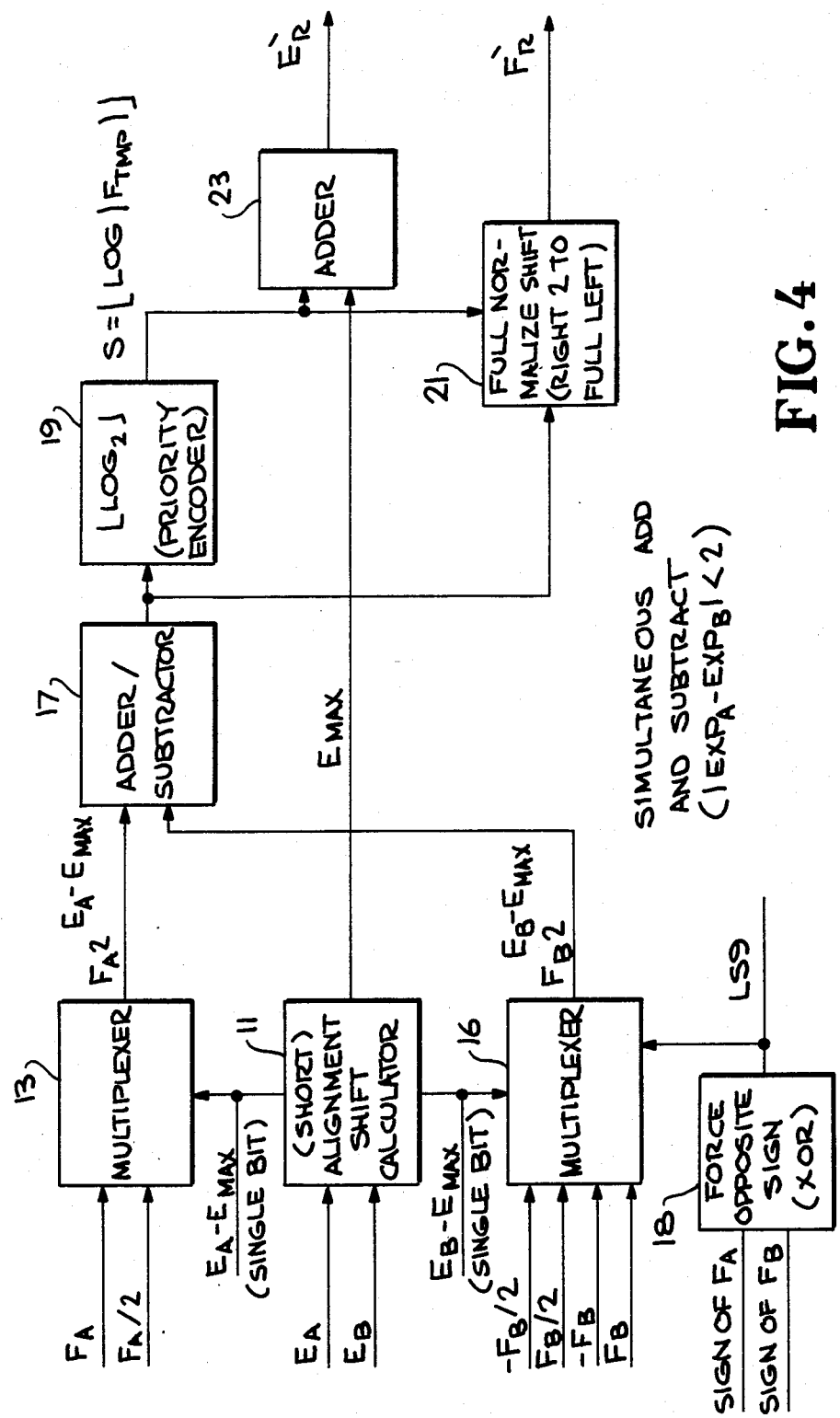
FIGS. 4 and 5 are schematic views of complementary apparatus, used in combination in simultaneously performing floating point addition and floating point subtraction according to the subject invention with significantly less than twice the hardware required to do either operation individually.
Figure 5:
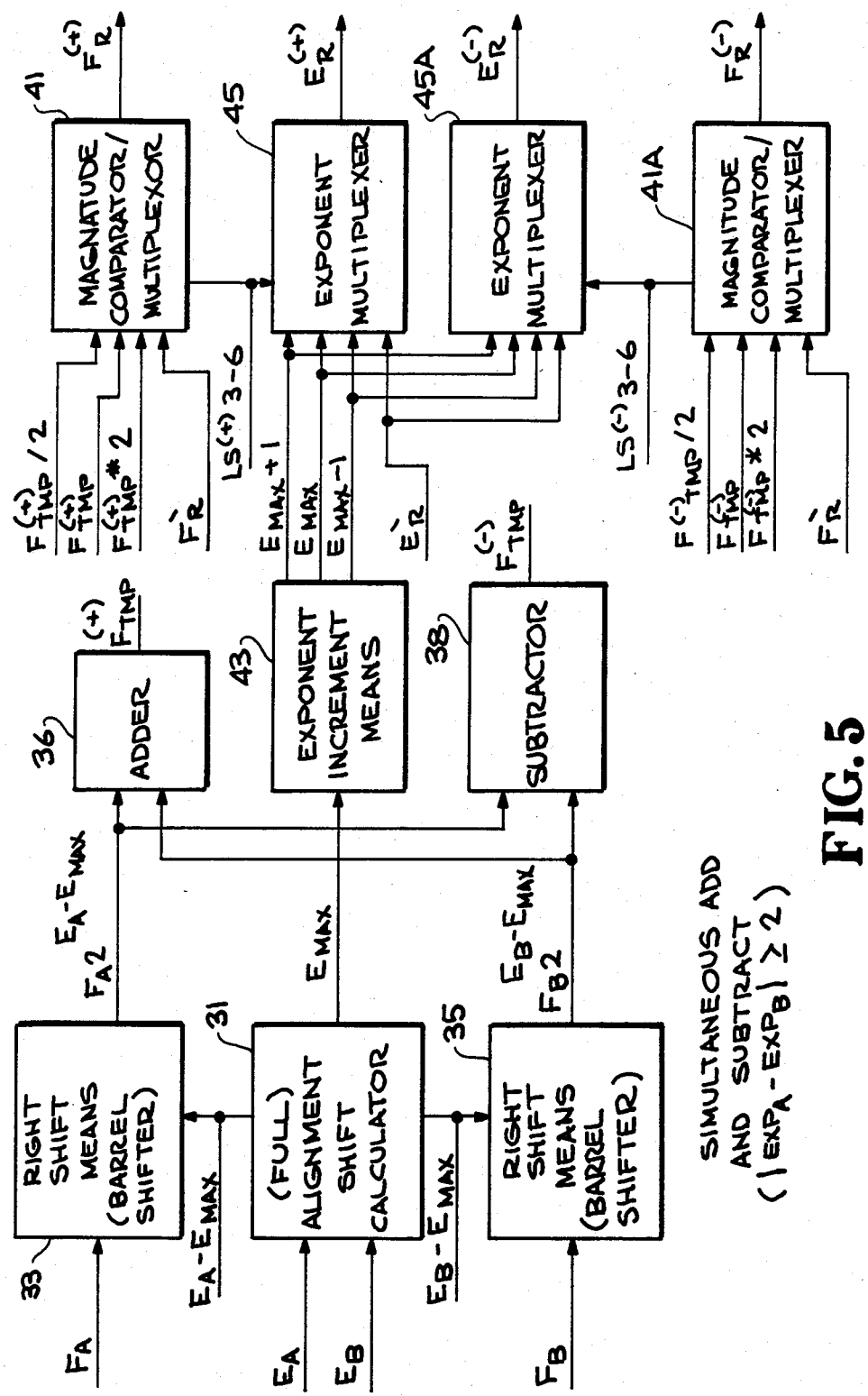

FIGS. 4 and 5 illustrate a second embodiment of the invention, useful for simultaneously generating the sum and difference of two numbers, $x_A\pm x_B=f_A 2^{e_A}\pm f_B 2^{e_B}$ with only a modest increase in apparatus compared with apparatus for the generation of sums of numbers exhibited in FIGS. 2 and 3. In the embodiments illustrated in FIGS. 2 and 3, subtraction was performed essentially the same as addition, using complementary numbers (2's complement form), with the same apparatus. As shown in FIG. 4, for the case where $|e_A-e_B|<2$, a short alignment shift calculator 11 is used to determine the control signals $r_A$ and $r_B$ as was previously described. The signal $r_A$ is used as the select signal for a two input multiplexer 13 having inputs $f_A$ and $\frac{1}{2} f_A$; thus, the quantity $f_A$ is shifted at most one bit. The output from multiplexer 13 is input to adder/subtractor 17. The signal $r_B$ is applied as one select signal to four input multiplexer 16 having inputs $f_B$, $\frac{1}{2} f_B$, $-f_B$, $-\frac{1}{2} f_B$ where the negative members are in 2's complement form. Force opposite sign means 18, which is an exclusive OR gate, generates an output signal LS9 from two inputs which are the sign bits of $f_A$ and $f_B$. The signal LS9 is applied as a second select signal to multiplexer 16 and is used to select the positive or negative output while signal $r_B$ is used to select the unshifted or single bit shifted output. The output from multiplexer 16 is also input to adder/subtractor 17. Thus, the output from gate 18 determines if the two numbers are added or subtracted. The multiplexer 16 outputs $\pm f_B 2^{-r_B}$, according to sign latch LS9 and signal $r_B$; and this output together with output $f_A 2^{-r_A}$ from the multiplexer 13 are input to an adder/subtractor 17. For the situation $|e_A-e_B|\leq 1$, the remainder of the components of FIG. 4 are the same as in FIG. 2 to produce the resultant $e'_r(\pm)=e_{max}+S(\pm)$ and $f'_r(\pm)=2^{-S(\pm)}f(\pm)_{tmp}$ for this situation, where $$S(\pm)=\lfloor\log_2|f_A 2^{-r_A}\pm f_B 2^{-r_B}|\rfloor \text{ and}$$
$$f(\pm)_{tmp}=f_A 2^{-r_A}\pm f_B 2^{-r_B}.$$

The independent parallel computation for the case $|e_A-e_B|\geq 2$ is illustrated with reference to FIG. 5, where adder/subtractor 37 of FIG. 3 is replaced by separate adder 36 and subtractor 38 that receive the signals $f_A 2^{-r_A}$ and $f_B 2^{-r_B}$ from shift means 33 and 35. Adder 36 forms the sum $f_A 2^{-r_A}+f_B 2^{-r_B}=f(\pm)_{tmp}$ and subtractor 38 forms the difference $f_A 2^{-r_A}-f_B 2^{-r_B}=f(-)_{tmp}$. The remainder of the components of FIG. 5 function as in FIG. 3 to produce the resultant $e_r=e_{max}+\{S, 1, 0 \text{ or } -1\}$ and $f_r(\pm)=\{2^{-S}, 0.5, 1.0 \text{ or } 2.0\}\times f(\pm)_{tmp}$ for the situation $|e_A-e_B|\geq 2$ or $\geq 2$ with hardware duplicated on the sum and difference paths.

The output from adder 36 is input either unshifted or shifted one bit to the left or right to the inputs of magnitude comparator/multiplexer 41; the result $f'_r$ from FIG. 4 is applied to the fourth input. The signal $e_{max}$ for calculator 31 is input to exponent increment means 43 which provides three inputs $e_{max}$, $e_{max}+1$, $e_{max}-1$ to exponent multiplexers 45 and 45A. The output from subtractor 38 is input either unshifted or shifted one bit to the left or right to three inputs of magnitude comparator/ multiplexer 41A with the result $f'_r$ from FIG. 4 applied as the fourth input. The comparators 41 and 41A select the proper output as previously described and provide latch signals LS3-6 to multiplexers 45 and 45A to select the proper exponent. Thus, the sum and difference of the two numbers are simultaneously obtained from components 41 and 45 and 41A and 45A.

The apparatus of FIGS. 4 and 5 is useful in generating sums or differences ($x_A \pm x_B$) of floating point numbers serially with substantially the same hardware. To perform operations such as the Fast Fourier Transform, simultaneous generation of sums and differences is required. In this instance, the component apparatus of FIGS. 4 and 5 can still be used since sufficient dedicated hardware has been provided for forming the simultaneous sum and difference.

The cicuitry shown in the drawings, described in the specification, used in the reduction to practice, and found to operate successfully in accordance with the invention, are implemented in combination with a 64 bit supercomputer, which provides all the other elements necessary to form an operational digital computer, and which is described in S-1 Project FY 1979 Annual Report, University of California Lawrence Livermore National Laboratory, UCID-18619 (1979), which is incorporated herein by reference. The circuitry can be designed for any number of bits by utilizing the appropriate number of elements. The apparatus for floating point operation is used in combination with a conventional computer which provide all of the necessary functions to operate the floating point apparatus, e.g., forming 2's complements for subtraction operations, or rounding off.

A preferred embodiment of the invention has been constructed using the Fairchild F100K ECL family of logic components. The two-input multiplexers are F100155 Quad Multiplexer/Latch chips while the four-input multiplexers are F100171 Triple 4-Input Multiplexer with Enable chips. The adders are implemented using the F100180 High Speed 6-Bit Adder with the F100179 Carry Lookahead Generator. The priority encoder (count leading zeros) is the F100165 Universal Priority Encoder. The full shifter (barrel shifter) is implemented with the F100158 8-Bit Shift Matrix. These components are described in the Fairchild F100K ECL Data Book, which is herein incorporated by reference.

The preferred embodiments of the invention are implemented using conventional components. Computer structure is described in *The Structure of Computers and Computations, Vol. I,* by David J. Kuck, J. Wiley and Sons (1978); and *Computer Arithmetic Principles, Architecture and Design,* by Kai Hwang, J. Wiley and Sons (1979). Floating point arithmetic is described in Kuck, pages 210-216, and Hwang, Chapter 9, which are herein incorporated by reference. A general type of shift means is illustrated by the barrel shifter described in Kuck, pages 231-233. A floating point add unit is illustrated in Hwang, FIG. 9.17 on page 314. The functional means which produces the function S is a priority encoder, e.g., the zero digit check (ZDC) shown in FIG. 9.17. Equivalently, the functional means are implemented using one position counting as described in Kuck, pages 233-234. The preferred embodiments of the invention utilize conventional digital multiplexers, as described in Hwang, pages 33-36; likewise, comparators are conventional digital components, as illustrated in Hwang, pages 45-47 (FIGS. 2.12 and 2.13).

To summarize the basic principles and operations according to the invention an alignment shift calculator receives the integer exponent signals $e_A$ and $e_B$, forms the intermediate difference $e_A - e_B$, and determines whether $e_A - e_B$ is positive, negative or zero. If $e_A - e_B > 0$, the calculator sets $e_{max} = \max(e_A, e_B) = e_A$, $r_A = \max(0, e_B - e_A) = 0$ and $r_B = \max(e_A - e_B, 0) = e_A - e_B$. If $e_A - e_B < 0$, the calculator sets $e_{max} = e_B$ and $r_A = r_B = 0$. In a short alignment calculator, $e_A - e_B = -1, 0$ or $+1$ so that the integers $e_{max}$, $r_A$ and $r_B$ may be quickly determined by testing only the two lowest bits.

A two input multiplexer receives the input signals $f_A$, $\frac{1}{2} f_A$ and select signal $r_A$ and outputs a single signal $f_0 = f_A$ (if $r_A = 0$) and $f_0 = \frac{1}{2} f_A$ (if $r_A = 1$), or $f_0 = f_A 2^{-r_A}$ for either choice of $r_A$, thus providing either an unshifted or one-bit shifted output.

Three mutually distinct alternatives are possible:
(1) $r_A = 1$, $r_B = 0$ and $e_B - e_A = +1$;
(2) $r_A = 0$, $r_B = 1$ and $e_A - e_B = +1$;
(3) $r_A = r_B = 0$ and $e_A = e_B$.

If the first alternative is present, $x_B = 2^{e_B} f_B > x_A = 2^{e_A} f_A$ and $x_A + x_B = 2^{e_B}\{f_B + 2^{(e_A - e_B)} f_A\} = 2^{e_B}\{f_B + \frac{1}{2} f_A\}$; and if it is assumed for definiteness that $f_B > 0$ ($1 \leq f_B < 2$), then $0 < f_B + \frac{1}{2} f_A < 3$.

$(0 < |f_B + \frac{1}{2} f_A| < 3$, more generally.)

Similarly, if the second alternative is present and one assumes that $f_A > 0$ for definiteness ($1 \leq f_A \leq 2$), $$x_A + x_B = 2^{e_A}\{f_A + \frac{1}{2} f_B\}$$

$$0 < f_A + \frac{1}{2} f_B < 3.$$

$(0 < |f_A + \frac{1}{2} f_B| < 3$, more generally.)

If the third alternative is present, $$x_A + x_B = 2^{e_A}\{f_A + f_B\},$$

$$-4 < f_A + f_B < 4,$$

$$0 < |f_A + f_B| < 4.$$

In any event, the signal $f_{tmp} = 2^{-r_A} f_A + 2^{-r_B} f_B$ is easily formed and satisfies $0 < |f_{tmp}| < 4$.

The priority encoder receives the signal $f_{tmp}$ and produces an output signal $S = \lfloor |\log_2 |f_{tmp}| \rfloor$. If $|f_{tmp}| = (h_2, h_1, h_0, \ldots, h_{-n+2})$ in binary representation, S is the highest integer p for which $h_p = 1$; and $-(n-2) \leq S \leq 1$. Alternatively, if no $h_p = 1$ then $f_{tmp} = 0$ and $x_A + x_B = 0$. If $f_{tmp} \neq 0$, $f_r = 2^{-S} f_{tmp}$ satisfies $1 \leq f_r \leq 2$. Thus, $x_A + x_B = 2^{e_{max}} f_{tmp} = 2^{e_{max} + S} f_r$ which displays the floating point decomposition of the sum $x_A + x_B$ when $|e_A - e_B| \leq 1$.

If $|e_A - e_B| \leq 2$, one again utilizes right shift means and left shift means, an adder, an exponent increment means to produce the integer signals $e_{max} + 1$ and $e_{max} - 1$, given the input integer signal $e_{max}$ and a magnitude comparator.

The magnitude comparator receives the left-shifted signals $2^{-S}g_{tmp}$, $\frac{1}{2}g_{tmp}$, $g_{tmp}$, and $2/g_{tmp}$, where $g_{tmp}=f_A2^{-r_A}+f_B2^{-r_B}$. If one represents $g_{tmp}$ in binary form as $$g_{tmp} = (\pm)(g_p, g_{p-1}, \ldots, g_1, g_0, g_{-1}, \ldots, g_{n-p})$$

$$= (\pm)\sum_{k=-p}^{n} g_k 2^k, \quad (g = 0 \text{ or } 1)$$

one easily verifies that $|g_{tmp}| < 2$ if and only if $g_k = 1$ for some $k \geq 1$,
$1 \leq |g_{tmp}| < 2$ if and only if $g_0 = 1$ and $g_k = 0$ for all $k \geq 1$,
$|g_{tmp}| < 1$ if and only if $g_k = 0$ for all $k \geq 0$.

Thus, the magnitude comparator first determines whether (1) $g_k = 1$ for some $k \geq 1$, in which case a positive third latch signal is generated and the comparator output signal is $f_r = \frac{1}{2} g_{tmp}$ or (2) $g_k = 0$ for all $k \geq 1$ and $g_0 = 0$, in which case a positive fourth latch signal is generated and the comparator output signal is $f_r = g_{tmp}$ or (3) $g_k = 0$ for all $k \geq 0$ but $g_{-1} = 1$, in which case a positive fifth latch signal is generated and the comparator output signal is $f_r = 2 g_{tmp}$ or (4) $g_k = 0$ for all $k \geq -1$ in which case the result from the case $|e_A - e_B| \leq 1$ is required, i.e., $2^{-S}g_{tmp}$. From the previous development it is known that for $$|e_A - e_B| \geq 2$$

$$\tfrac{1}{2} \leq |g_{tmp}| \leq 5/2;$$

and one easily verifies from a consideration of the four cases that $1 \leq |f_r| < 2$ for all cases. With the definition $e_{max}+1$ if $|g_{tmp}| \geq 2$ $e_r = e_{max}$ if $1 \leq |g_{tmp}| < 2$ $e_{max}-1$ if $\tfrac{1}{2} \leq |g_{tmp}| < 1$, $e_{max}+S$ if $|g_{tmp}| < \tfrac{1}{2}$ one verifies that $$x_A + x_B = 2^{e_{max}}g_{tmp} = 2^{e_r}f_r,$$

which displays the floating point decomposition of the sum $x_A + x_B$ when $e_A - e_B \geq 2$.

The following illustrative examples show how floating point calculations are performed according to the invention. For illustration, where negative numbers are involved, the operation of straight substration is shown (instead of the formation of 2's complements and addition).

EXAMPLE 1

Situation 1 $|e_a - e_B| \leq 1$
Add
$1.111 * 2^{101110}$ (decimal $1.875 * 2^{46}$)
and
$-1.000 * 2^{101111}$ (decimal $-1.000 * 2^{47}$)
The mantissas and exponents are
$f_A = 1.111, e_A = 101110$,
$f_B = -1.000, e_B = 101111$
The exponent difference $|e_A - e_B| = 1$
Following the FIG. 2 path:
The low order bits of $e_A$ are 10 (decimal 2) and the low order bits of $e_B$ are 11 (decimal 3). Considering only these bits, then if the exponents are close, i.e., all the higher bits are identical, then $e_A = e_B - 1$ so $r_A = -1$ and $r_B = 0$. The higher bits are not actually checked; the computation is performed as if the condition is true. The prealignment, thus, requires only that $f_A$ be shifted once to the right. The addition becomes $$\begin{array}{rl} 0.1111 & \tfrac{1}{2}f_A \\ -1.0000 & f_B \\ \hline -0.0001 & f_{tmp} \end{array}$$

By counting leading zeros, $S = -4$, resulting in $$f_r = 2^{-S}f_{tmp} = -1.0$$

$$e'_r = e_{max} + S = 101111 - 100 = 101011 \ (43)$$

Thus, the answer is $-1.0 * 2^{43}$.

Following the FIG. 3 path:
Identical values $r_A$ and $r_B$ are computed (but by a different method), so the addition is as before $$\begin{array}{r} 0.1111 \\ -1.0000 \\ \hline -00.0001 \end{array}$$

The magnitude comparator does not find a one bit in the three test bits, bit (1), bit (0) and bit (−1) (two bits before the point and one bit after) so the FIG. 3 path answers are rejected and the answer from the FIG. 2 path is selected as the correct answer (indicating that the exponent difference was at most one).

EXAMPLE 2

Situation 2 $|e_A - e_B| > 1$
Add
$1.111 * 2^{101100}$ (decimal $1.875 * 2^{44}$)
and
$-1.000 * 2^{101111}$ (decimal $-1.000 * 2^{47}$)
The first path, looking only at the two low order exponent bits, i.e., $e_A = 00$ and $e_B = 11$, determines that if the exponents are close, then $e_A = e_B - 1$ (which is obviously incorrect). Proceeding with $r_A = 0$ and $r_B = 1$ an incorrect answer is produced. The second path determines $r_A = -2$, $r_B = 0$. The addition becomes $$\begin{array}{rl} 0.01111 & f_a \text{ right shifted 2 bits} \\ -1.00000 & f_B \\ \hline -0.10001 & f_{tmp} \end{array}$$

The magnitude comparator checks the appropriate bits of $f_{tmp}$ and finds that bit $(0) = 0$ while bit $(-1) = 1$ so the correct result is $2 f_{tmp}$ (left shift by one) and $e_{max} - 1$:
$f_r = 1.0001$
$e_r = 101110$ Thus, the result is $-1.0001 \times 2^{101110} = -1.0625 \times 2^{46}$. Because one of the magnitude comparator tests was satisfied, the correct answer was generated by the FIG. 3 path and the incorrect answer produced by the FIG. 2 path was ignored.

The foregoing description of preferred embodiments of the invention has been presented for purposes of illustration and description. It is not intended to be exhaustive or to limit the scope of the invention to the precise form disclosed, and many modifications and variations are possible in light of the above teaching.

What is claimed:

1. In a method for performing floating point addition of a pair of floating point binary numbers each expressed as a mantissa and an exponent, comprising the steps of alignment of the mantissas, addition of the aligned mantissas and postnormalization of the mantissa of the sum, the improvement comprising;

comparing the exponents of the two floating point numbers prior to the alignment step;

simultaneously performing two separate calculations along first and second separate parallel paths as follows:

calculating a first sum in the first path as if the difference of the exponents is either 0 or 1, including performing the alignment step by at most a one place right shift of one mantissa;

simultaneously calculating a second sum in the second path as if the difference of the exponents is greater than 1, including performing the postnormalization step by at most a one place shift of the mantissa of the second sum;

selecting between the first sum and the second sum after simultaneously performing the two calculations.

2. The method of claim 1 further comprising selecting the correct answer by testing bits of the mantissa $f_{tmp}$ of the second sum to determine if any of the two bits before the binary point and the bit after the binary point are nonzero.

3. The method of claim 2 further comprising selecting the second sum if $\frac{1}{2} \leq |f_{tmp}| < 5/2$ and selecting the first sum if $|f_{tmp}| < \frac{1}{2}$.

4. The method of claim 3 further comprising simultaneously performing floating point subtraction of the pair of floating point binary numbers by the steps of alignment of the mantissas, subtraction and postnormalization, including calculating a first difference of the two numbers as if the difference of the exponents of the two numbers is either 0 or 1 including performing the postnormalization step by at most a one place shift of the mantissa of the first difference; simultaneously calculating a second difference of the two numbers as if the difference of the exponents is greater than 1 including performing the alignment step by at most a one place right shift of one of the mantissas; and selecting from the first and second difference.

5. Apparatus for performing floating point addition of two binary numbers, each having a mantissa and exponent, comprising (a) comparator means for determining the difference of the exponents;

(b) a first adder circuit comprising:

(1) first shift means for performing at most a one place right shift of one mantissa;

(2) first adder means connected to the first shift means for adding the mantissas to form a first sum;

(3) second shift means connected to the first adder means for realigning the mantissa of the first sum;

(c) a second adder circuit comprising:

(1) third shift means for aligning the mantissas of the two binary numbers;

(2) second adder means connected to the third shift means for adding the aligned mantissas to form a second sum;

(3) fourth shift means connected to the second adder means for performing at most a one place shift to realign the mantissa of the second sum;

(d) selection means for selectively choosing the output from the first adder circuit when the exponent difference is 0 or 1 and from the second adder circuit when the exponent difference is greater than 1.

6. The apparatus of claim 5 wherein the first adder circuit further includes priority encoder means connected to the output of the first adder means to determine the number of places to shift the sum of the aligned mantissas, the output of the priority encoder being connected to the second shift means to control the realignment of the mantissa of the sum.

7. The apparatus of claim 6 wherein the first adder circuit further includes a third adder means connected to the exponent comparator and to the priority encoder to add the output of the priority encoder to the greater of the two exponents of the two numbers.

8. The apparatus of claim 5 wherein the first shift means comprises a pair of two input multiplexers, each having as inputs an unshifted mantissa and a one place right shifted mantissa.

9. The apparatus of claim 8 further including a short alignment shift calculator for comparing the two lowest order bits of the two exponents and connected to the multiplexers to select the unshifted or right shifted mantissa.

10. The apparatus of claim 5 wherein the selection means comprises a magnitude comparator for comparing the magnitude of the output from the second adder means with the values $\frac{1}{2}$, 1 and 2.

11. The apparatus of claim 10 wherein the fourth shift means comprises three inputs of a four-input multiplexer having as inputs the unshifted output of the second adder, the right shifted output of the second adder, and the left shifted output of the second adder, and further having the output of the second shift means connected to the fourth input.

12. The apparatus of claim 10 further including an exponent increment means and an exponent multiplexer means connected to the exponent increment means and the magnitude comparator for selecting the exponent of the same.

13. The apparatus of claim 5 wherein the third shift means comprises a pair of barrel shifters.

14. The apparatus of claim 5 further including first subtracter means in parallel with the second adder means and wherein the first shift means includes a four-input multiplexer having as inputs an unshifted mantissa, a right shifted mantissa, a negative mantissa, and a negative right shifted mantissa, and an exclusive OR gate to compare the signs of the two mantissas, the exclusive OR gate being connected to the multiplexer to select the positive or negative value of the unshifted or right shifted mantissa.

* * * * *